United States Patent
Baba et al.

(10) Patent No.: US 7,786,873 B2
(45) Date of Patent: Aug. 31, 2010

(54) FLEXIBLE RFID TAG PREVENTING BENDING STRESS AND BREAKAGE

(75) Inventors: Shunji Baba, Kawasaki (JP); Shigeru Hashimoto, Tokyo (JP); Yoshiyasu Sugimura, Tokyo (JP); Tsuyoshi Niwata, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 335 days.

(21) Appl. No.: 11/878,424

(22) Filed: Jul. 24, 2007

(65) Prior Publication Data
US 2008/0036609 A1    Feb. 14, 2008

(30) Foreign Application Priority Data

Aug. 10, 2006  (JP)  ............................ 2006-218573
Nov. 30, 2006  (JP)  ............................ 2006-322948
Dec. 27, 2006  (JP)  ............................ 2006-352826

(51) Int. Cl.
G08B 13/14 (2006.01)
(52) U.S. Cl. .................................. 340/572.7; 235/488
(58) Field of Classification Search .............. 340/572.7, 340/572.8; 235/488
See application file for complete search history.

(56) References Cited

U.S. PATENT DOCUMENTS

| | | | | |
|---|---|---|---|---|
| 5,200,601 | A * | 4/1993 | Jarvis | 235/488 |
| 6,437,985 | B1 * | 8/2002 | Blanc et al. | 340/572.7 |
| 7,405,664 | B2 * | 7/2008 | Sakama et al. | 340/572.7 |
| 2005/0093172 | A1 | 5/2005 | Tsukahara et al. | |

FOREIGN PATENT DOCUMENTS

| | | |
|---|---|---|
| EP | 0 383 435 | 8/1990 |
| EP | 0 913 268 A1 | 5/1999 |
| JP | 8-282167 | 10/1996 |
| JP | 2000-311226 | 11/2000 |
| JP | 2001-351082 | 12/2001 |
| JP | 2003-223627 | 8/2003 |
| JP | 2003-317060 | 11/2003 |
| JP | 2004-341720 | 12/2004 |
| JP | 2005-235127 | 9/2005 |
| JP | 2005-346559 | 12/2005 |
| JP | 2000-200332 | 7/2007 |

OTHER PUBLICATIONS

Japanese Office Action issued on Jan. 17, 2009 in corresponding Japanese Patent Application 10-20070073464.
Japanese Office Action issued on Jun. 30, 2009 in corresponding Japanese Patent Application 2006-352826.
European Search Report, mailed Jul. 31, 2008, and issued in corresponding European Patent Application No. 07112201.4-2210.
European Office Action issued Sep. 25, 2009 in corresponding European Office Action 07 112 201.4.

* cited by examiner

*Primary Examiner*—John A Tweel, Jr.
(74) *Attorney, Agent, or Firm*—Staas & Halsey LLP

(57) ABSTRACT

A RFID tag, which decreases a bending stress and simultaneously prevents an antenna break, is provided. The RFID tag includes a base, an antenna for communication which extends on the base, a circuit chip which performs radio communication through the antenna. The RFID tag further includes a chip reinforcement member which covers a periphery of the circuit chip and a portion of the antenna and a covering member which cover the base, the antenna, the circuit chip and the chip reinforcement member. The covering member is more flexible than the chip reinforcement member.

11 Claims, 15 Drawing Sheets

FLEXIBLE RFID TAG PREVENTING BENDING STRESS AND BREAKAGE

BACKGROUND OF THE INVENTION

1. Field of the Invention

The present invention relates to an RFID (Radio_Frequency_IDentification) tag which exchanges information with an external device without contacting the device. Among people skilled in the field of the art, "the RFID tag" used in the present invention is also called as "a wireless IC tag."

2. Description of the Related Art

In recent years, various RFID tags have been proposed that exchange information with an external device represented by a reader and writer by a radio wave without contacting the external device (for example, see Japanese Patent Application Publications Nos. 2000-311226, 2000-200332 and 2001-351082). As a kind these RFID tags, one that has a configuration in which an antenna pattern for radio communication and a circuit chip are mounted on a base sheet made of a plastic or a paper is proposed. For such types of RFID tags, various applications are devised. For example, the RFID tag is attached to an article or the like to exchange information about the article with an external device for identifying them.

Of applications for the RFID tags, there is one included in which an RFID tag is attached to an article whose shape can be easily changed like clothes. In such application, one major problem is that the circuit chip receives a bending stress as the circuit chip is not easily bent while the base sheet is easily bent, causing the circuit chip to be cracked or peeled off. Conventionally, there have been proposed techniques in which the circuit chip including the periphery around the circuit chip is covered with a hard reinforcing member to prevent shape changing of the RFID tag from reaching the periphery around the circuit chip, thereby decreasing a bending stress applied to the circuit chip.

However, with such technique using the reinforcement member and the like described above, an end of the reinforcement member or the like crosses the antenna and a bending stress is concentrated at the cross point to cause a break of the antenna.

SUMMARY OF THE INVENTION

In the view of foregoing, according to the present invention, there is provided an RFID tag in which the bending stress to the circuit chip is decreased and a break of the antenna is prevented simultaneously.

Of the RFID tags according to the present invention, a first RFID tag includes:

a base;

an antenna for communication that extends on the base;

a circuit chip that is electrically connected to the antenna and that performs radio communication through the antenna;

a chip reinforcement member that covers at least upper portions both of at least a periphery of the circuit chip and at least a portion of the antenna when the base is arranged as a bottom of the RFID tag; and a covering member that covers the base, the antenna, the circuit chip and the chip reinforcement member, and that is more flexible than the chip reinforcement member.

According to the first RFID tag of the present invention, since a periphery of the circuit chip which is a key component to perform radio communication is covered with the chip reinforcement member, a bending stress to the circuit chip is decreased. In addition, since a portion where the edge of the chip reinforcement member and the antenna cross each other is covered with a flexible covering member which fully covers the circuit chip and the chip reinforcement member, a concentration of a bending stress in this portion is suppressed and thereby a break of the antenna is prevented. In other words, according to the first RFID tag of the present invention, a bending stress to the circuit chip is decreased and a break of the antenna is prevented simultaneously. In addition, as an example of material for the chip reinforcement member, a hard plastic is exemplified. However, in the first RFID tag of the present invention, a range covered with the chip reinforcement member is limited to only a portion on the base. Therefore, the base, which typically has flexibility, allows a degree of freedom outside an area protected by the chip reinforcement member. The first RFID tag of the present invention changes shape approximately in accordance with shape change of an article such as a piece of clothes to which the RFID tag is attached. Further, even in a case in which the first RFID tag of the present invention directly touches a user, since this RFID tag is fully covered with the covering member which has flexibility, it is possible to prevent the hard chip reinforcement member from directly touching a user. Furthermore, in the first RFID tag of the present invention, even if this RFID tag is broken, since the covering member is provided, it is possible to prevent debris or the like of the broken RFID tag from injuring a user. Thus, in the first RFID tag of the present invention, consideration to a user is given so that the user may not feel uncomfortable when directly touching the RFID tag attached to an article the user puts on.

Here, in the first RFID tag of the present invention, it is a preferable example that "the chip reinforcement member does not contact with the base, the antenna and the circuit chip and that is embedded in the covering member".

According to this preferable example of the first RFID tag, since the chip reinforcement member does not contact with the base or other components, such an event is prevented as a concentration of a bending stress is produced due to the chip reinforcement member.

In addition, in the first RFID tag of the present invention, it is another preferable example that "the RFID tag further includes a bottom reinforcement member that is located such that the bottom reinforcement member and the chip reinforcement member sandwich the base, and that is embedded in the covering member without contacting with the base".

According to this preferable example of the first RFID tag, protection for the circuit chip is further improved by the bottom reinforcement member. In addition, since this bottom reinforcement member does not contact the base, it is possible to prevent such an event as a concentration of a bending stress is produced due to this bottom reinforcement member is prevented.

Further, of the RFID tags according to the present invention, a second RFID tag includes:

a base;

an antenna for communication that extends on the base;

a circuit chip that is electrically connected to the antenna to perform radio communications through the antenna;

a chip reinforcement member that covers at least upper portions both of at least a periphery of the circuit chip and at least a portion of the antenna when the base is arranged as a bottom of the RFID tag; and an edge covering member that covers at least a portion of an edge of the chip reinforcement member, the portion where the edge of the chip reinforcement member and the antenna cross each other, the edge covering member being more flexible than the chip reinforcement member.

According to the second RFID tag of the present invention, since a periphery of the circuit chip which is a key component to perform radio communication is covered with the chip reinforcement member, a bending stress to the circuit chip is decreased. In addition, since a portion where the edge of the chip reinforcement member and the antenna cross each other is covered with the flexible edge covering member, a concentration of a bending stress in this portion is suppressed and prevents a break of the antenna. In other words, also by the second RFID tag of the present invention, a bending stress to the circuit chip is decreased and a break of the antenna is prevented simultaneously.

Here, in the first and second RFID tags of the present invention, it is a typical example that "the base is more flexible than the chip reinforcement member".

In addition, in the first and second RFID tags of the present invention, it is a preferable example that "the chip reinforcement member covers only a periphery of the circuit chip and a portion of the antenna".

According to this preferable example of the RFID tag, while the chip reinforcement member covers a periphery of the circuit chip to protect the circuit chip, open space over this circuit chip makes the RFID thin.

In addition, in the first and second RFID tags of the present invention, it is another preferable example that "the RFID tag further includes a bottom reinforcement member that is located such that the bottom reinforcement member and the chip reinforcement member sandwich the base."

According to this preferable example of the RFID tag, protection for the circuit chip is further improved by the bottom reinforcement member.

In addition, a RFID manufacturing method according to the present invention includes steps of:

a preparing step for preparing an inlay that includes a base, an antenna for communication that extends on the base, a circuit chip that is electrically connected to the antenna and that performs radio communication through the antenna, and a chip reinforcement member that covers at least a periphery of the circuit chip and a portion of the antenna at least on the upper face of the base when the base is in a lower side; and a covering step for covering the inlay such that a spacer is arranged around the chip reinforcement member, the spacer being more flexible than the chip reinforcement member, and the inlay and the spacer are sandwiched by multiple sheet members which are made of the same material as the material of the spacer and are heated and pressed to be integrated.

According to the manufacturing method of the invention, the RFID tag in which a bending stress to the circuit chip is decreased and a break of the antenna is prevented can be readily manufactured. Further, through the covering process in which the spacer is arranged around the chip reinforcement member and then the inlay and the spacer are sandwiched by multiple sheet members, the shape of the RFID tag is flattened.

In addition, with respect to the RFID manufacturing method according to the present invention, only a basic example is described in order to avoid redundant descriptions. However, the manufacturing method according to the present invention includes various examples corresponding to the examples of the RFID tags described above as well as this example.

As described above, according to the present invention, the RFID tag in which a bending stress to the circuit chip is decreased and simultaneously a break of the antenna is prevented can be obtained.

DETAILED DESCRIPTION OF THE INVENTION

Exemplary embodiments according to the present invention will be described with reference to the accompanying drawings.

First, a first embodiment of the RFID tag according to the present invention will be described.

Figure 1:
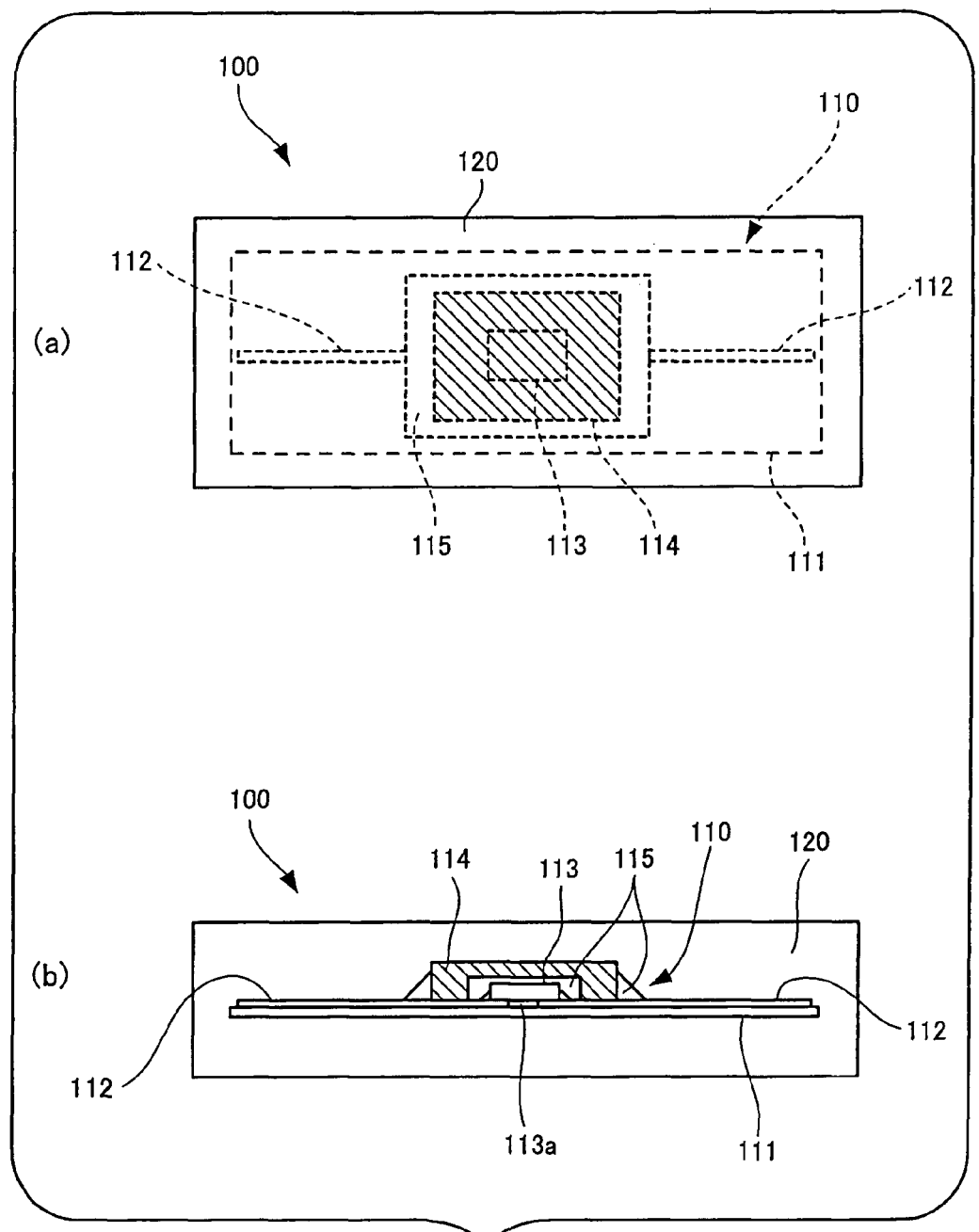
FIG. 1 is a schematic diagram showing a first embodiment of the RFID tag according to the present invention.

FIG. 1 is a schematic diagram showing the first embodiment of the RFID tag according to the present invention.

In part (a) of FIG. 1, a top view of an RFID tag 100, the first embodiment of the RFID tag according to the present invention is shown in a state where an internal structure of the RFID tag 100 is seen through. In part (b) of FIG. 1, a lengthwise cross section of the RFID tag 100 is shown.

The RFID tag 100 shown in FIG. 1 is supposed to be attached to an article which a user wears such as clothes whose shape can be easily changed. The RFID tag 100 has a configuration in which an inlay 110 is covered with a rubber covering member 120. The inlay 110 includes a base 111 formed with a PET film, an antenna 112 for communications extending on the base 111, a circuit chip 113 which is electrically connected to the antenna 112 for performing radio communication through the antenna 112, a chip reinforcement member 114 made of a fiber reinforced resin which covers a periphery of the circuit chip 113. In addition, the circuit chip 113 is electrically connected to the antenna and is fixed to the base 111 by gluing with an adhesive 113a. Further, as shown in FIG. 1, the chip reinforcement member 114 is located on the base 111 such that the chip reinforcement member 114 houses the circuit chip 113 therein, and is fixed to the base 111 by gluing with a thermosetting adhesive 115. In addition, this thermosetting adhesive 115 is also applied to fill the gap between the chip reinforcement member 114 and the circuit chip 113. Here, the base 111, the antenna 112, the circuit chip 113, the chip reinforcement member 114, the inlay 110 and the covering member 120 are examples of the base, the antenna, the circuit chip, the chip reinforcement member, the inlay and the covering member according to the present invention respectively.

When the RFID tag 100 is attached, for example, to a piece of clothes, it is prevented that shape change of the piece of clothes affects the circuit chip 113 itself or a periphery of the circuit chip 113 by covering a periphery of the circuit chip 113 with the chip reinforcement member 114 formed with a hard material, a fiber reinforced resin. Consequently, the circuit chip 113 itself, a connecting portion between the circuit chip 113 and the antenna 112 or a glued portion between the circuit chip 113 and the base 111 are prevented from being damaged to be broken.

Here, in the RFID tag 100, an area protected by the chip reinforcement member 114 is limited to an area near the circuit chip 113. Therefore, the base 111 formed with the pet film and thereby having flexibility allows degree of freedom in a wide range outside the area protected by the chip reinforcement member 114. In addition, as described above, the RFID tag 100 is covered with the covering member 120 which is made of a flexible rubber. For this, because a portion where an edge of the adhesive 115 and the antenna 112 cross each other is covered with the flexible covering member 120, a concentration of a bending stress in this cross portion is suppressed and thereby preventing a break of the antenna 112. In other words, in the RFID tag 100 shown in FIG. 1, a bending stress to the circuit chip is decreased and simultaneously a break of the antenna is prevented.

In addition, this RFID tag 100 changes shape in a wide area except for the periphery of the circuit chip 113 protected by the chip reinforcement member 114 in accordance with a shape change of an article such as a piece of clothes to which the RFID tag 100 is attached. Further, because this RFID tag 100 is entirely covered with the covering member 120 which is flexible, it is prevented that the chip reinforcement member 114 which is hard directly touches a user even in a case in which this RFID tag 100 directly touches the user. Furthermore, even if this RFID tag 100 is broken, it is prevented that debris of the broken tag injures a user because there is arranged the covering member 120 which entirely covers this RFID tag 100. In other words, this RFID tag 100 shown in FIG. 1 is configured such that this RFID tag 100 withstands harsh environments with consideration to a user.

Next, a second embodiment of the RFID tag according to the present invention will be described.

Figure 2:
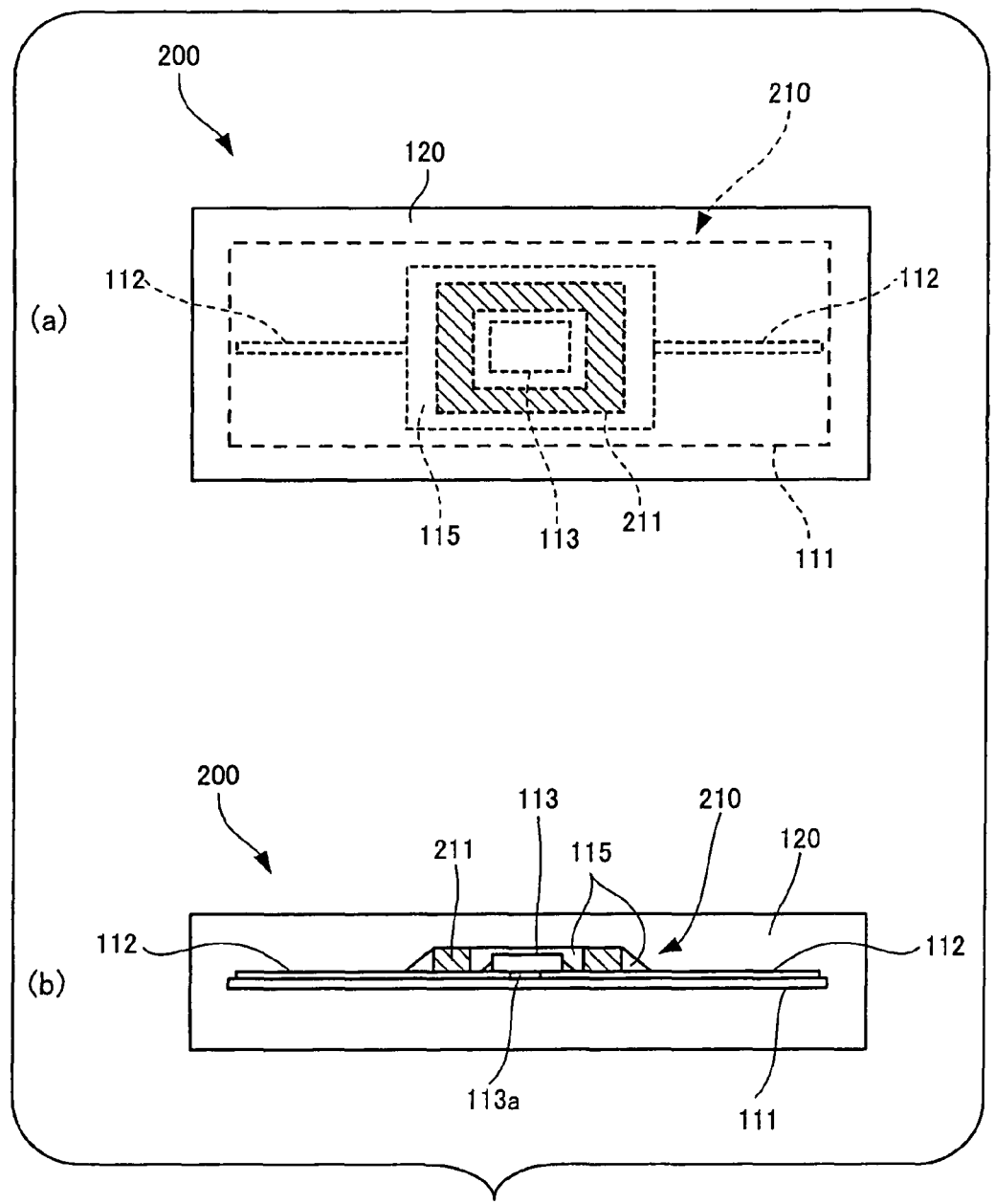
FIG. 2 is a schematic diagram showing a second embodiment of the RFID tag according to the present invention.

FIG. 2 is a schematic diagram showing the second embodiment of the RFID tag according to the present invention.

In part (a) of FIG. 2, a top view of an RFID tag 200, the second embodiment of the RFID tag according to the present invention is shown in a state where an internal structure of the RFID tag 200 is seen through. In part (b) of FIG. 2, a lengthwise cross section of this RFID tag 200 is shown.

Besides, in FIG. 2, elements equal to the ones of the first embodiment shown in FIG. 1 described above are given the same reference characters as in FIG. 1. In the following, redundant descriptions for these elements will be omitted.

In the RFID tag 200 of this embodiment, an inlay 210 includes a chip reinforcement member 211 whose shape is different from that of the chip reinforcement member 114 of the first embodiment. The inlay 210 and the chip reinforcement member 211 shown in FIG. 2 correspond to examples of the inlay and the chip reinforcement member according to the present invention respectively.

The chip reinforcement member 211 has a configuration that the roof portion of the chip reinforcement member 114 of the first embodiment shown in FIG. 1 is removed so as to open the space above the circuit chip 113. Also in this chip reinforcement member 211, it is prevented that a shape change of the RFID tag 200 affects a periphery of the circuit chip 113. In addition, because a portion where an edge of the adhesive 115 and the antenna 112 cross each other is covered with the flexible covering member 120, a break of the antenna 112 is prevented. Further, the open space above the circuit chip 113 makes the RFID tag 200 thinner by a portion corresponding to the removed roof portion of the chip reinforcement member 114.

Thus, the RFID tag 200 shown in FIG. 2 is configured such that the RFID tag 200 is thinned while protecting the circuit chip and preventing a break of the antenna as in the RFID tag 100 of the first embodiment.

Next, a third embodiment of the RFID tag according to the present invention will be described.

Figure 3:
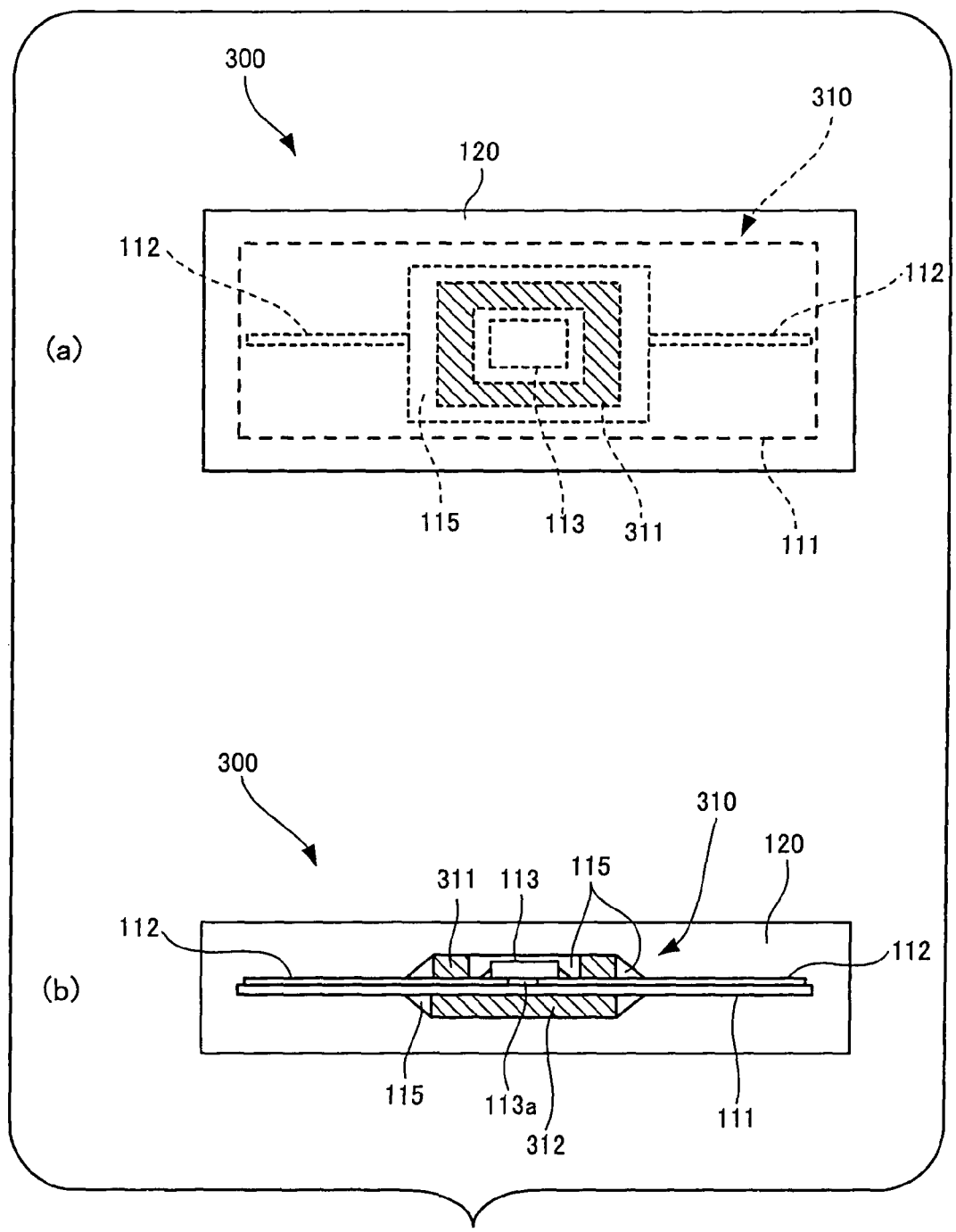
FIG. 3 is a schematic diagram showing a third embodiment of the RFID tag according to the present invention.

FIG. 3 is a schematic diagram showing the third embodiment of the RFID tag according to the present invention.

In part (a) of FIG. 3, a top view of an RFID tag 300, the third embodiment of the RFID tag according to the present invention is shown in a state in which an internal structure of the RFID tag 300 is seen through. In part (b) of FIG. 3, a lengthwise cross section of this RFID tag 300 is shown.

Besides, also in FIG. 3, elements equal to the ones of the first embodiment shown in FIG. 1 described above are given the same reference characters as in FIG. 1. In the following, redundant descriptions for these elements will be omitted.

In the RFID tag 300 of this embodiment, an inlay 310 includes a chip reinforcement member 311 equal to the chip reinforcement member 211 of the second embodiment shown in FIG. 2, and a bottom reinforcement member 312 which is arranged such that the chip reinforcement member 311 and bottom reinforcement member 312 sandwich the base 111 and are located opposite to each other with respect to the base 111. The inlay 310 and the chip reinforcement member 311 shown in FIG. 3 correspond to examples of the inlay and the chip reinforcement member according to the present invention respectively. In addition, the bottom reinforcement member 312 corresponds to an example of the bottom reinforcement member according to the present invention.

Similarly to the chip reinforcement member 311, the bottom reinforcement member 312 is made of a fiber reinforced resin and is fixed on the bottom of the base 111 by gluing with the thermosetting adhesive 115 equal to the adhesive 115 which glues the chip reinforcement member 311 on the base 111. Further, in this embodiment, the bottom reinforcement member 312 has the same shape as that of the chip reinforcement member 311 except that an opening for housing the circuit chip 113 is not provided.

This RFID tag 300 shown in FIG. 3 is configured such that protection of the circuit chip is strengthened by this bottom reinforcement member 312 while keeping prevention of a break of the antenna and the like which are made in the second embodiment described above.

Next, a fourth embodiment of the RFID tag according to the present invention will be described.

Figure 4:
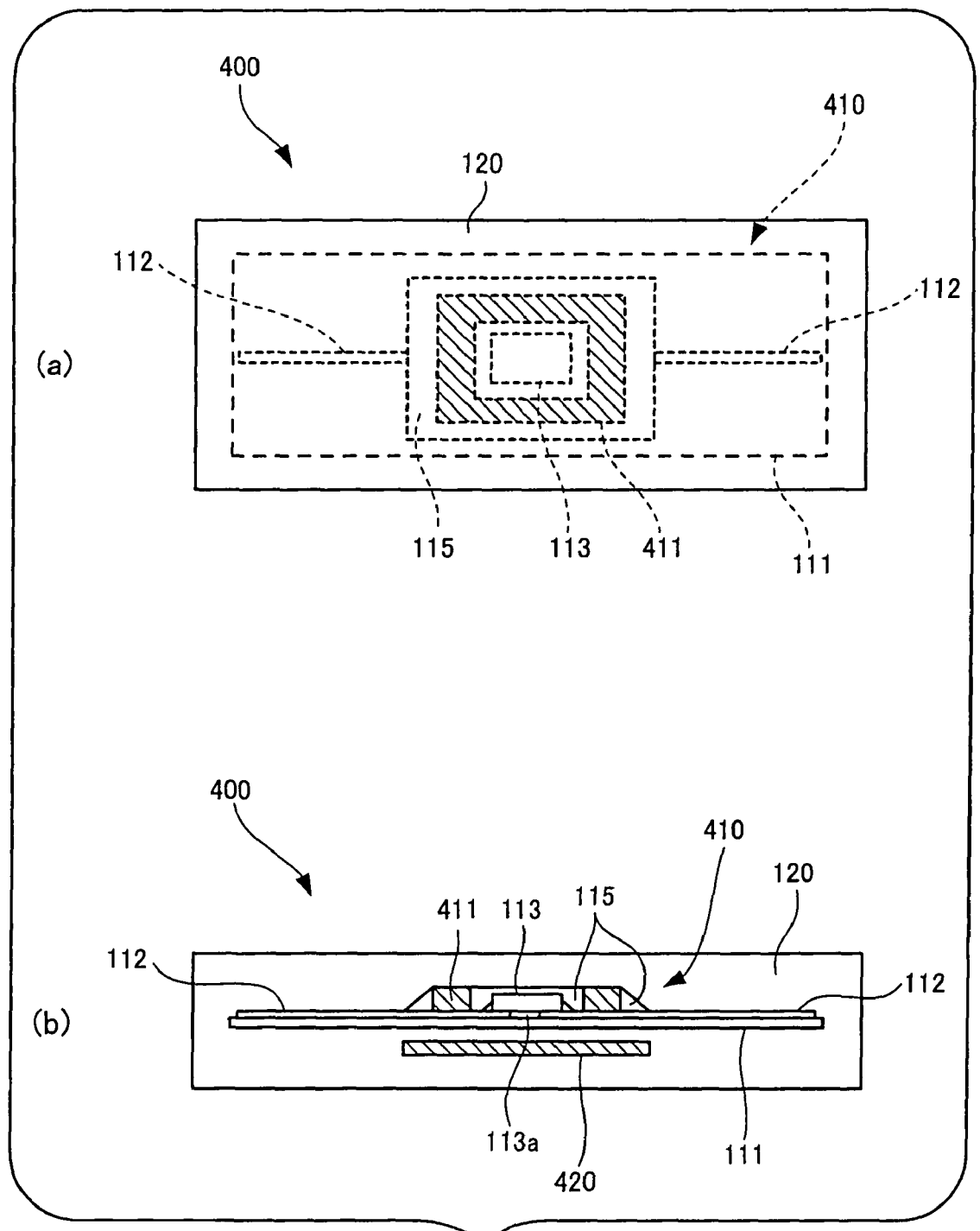
FIG. 4 is a schematic diagram showing a fourth embodiment of the RFID tag according to the present invention.

FIG. 4 is a schematic diagram showing the fourth embodiment of the RFID tag according to the present invention.

In part (a) of FIG. 4, a top view of an RFID tag 400, the fourth embodiment of the RFID tag according to the present invention is shown in a state in which an internal structure of this RFID tag 400 is seen through. In part (b) of FIG. 4, a lengthwise cross section of this RFID tag 400 is shown.

Besides, also in FIG. 4, elements equal to the ones of the first embodiment shown in FIG. 1 described above are given the same reference characters as in FIG. 1. In the following, redundant descriptions for these elements will be omitted.

In the RFID tag 400 of this embodiment, an inlay 410 includes a chip reinforcement member 411 equal to the chip reinforcement member 211 of the second embodiment shown in FIG. 2, and a bottom reinforcement member 420 which is arranged such that the chip reinforcement member 411 and bottom reinforcement member 420 sandwiches the base 111 and are located opposite to each other with respect to the base 111. However, the bottom reinforcement member 420 of this embodiment is different from the third embodiment described above in that it is separated from the base 111. In addition, the bottom reinforcement member 420 according to this embodiment is neither made of the same material nor has the same shape as that of the reinforcement member 411 unlike the bottom reinforcement member of the third embodiment does. The bottom reinforcement member 420 of this embodiment is formed with a plastic sheet which has flexibility for bending and suppresses expanding. The bottom reinforcement member 420 has a shape wide enough to protect an area wider than the chip reinforcement member 411. A covering member 120 made of a rubber extends between the bottom reinforcement member 420 and the base 111. The inlay 410 and the chip reinforcement member 411 shown in FIG. 4 correspond to examples of the inlay and the chip reinforcement member according to the present invention respectively. In addition, the bottom reinforcement member 420 corresponds to an example of the bottom reinforcement member according to the present invention.

This RFID tag 400 shown in FIG. 4 is configured such that the protection of the circuit chip is strengthened by this bottom reinforcement member 420 while keeping the prevention of a break of the antenna and the like, similarly to the RFID tag 300 of the third embodiment.

Next, an embodiment of the RFID tag manufacturing method according to the present invention will be described.

In the following, a RFID tag manufacturing method for manufacturing the RFID tag 400 of the fourth embodiment shown in FIG. 4 as an embodiment of the RFID tag manufacturing method according to the present invention will be described. Here, the element numbers shown in FIG. 4 will be referred without the description of "FIG. 4".

Figure 5:
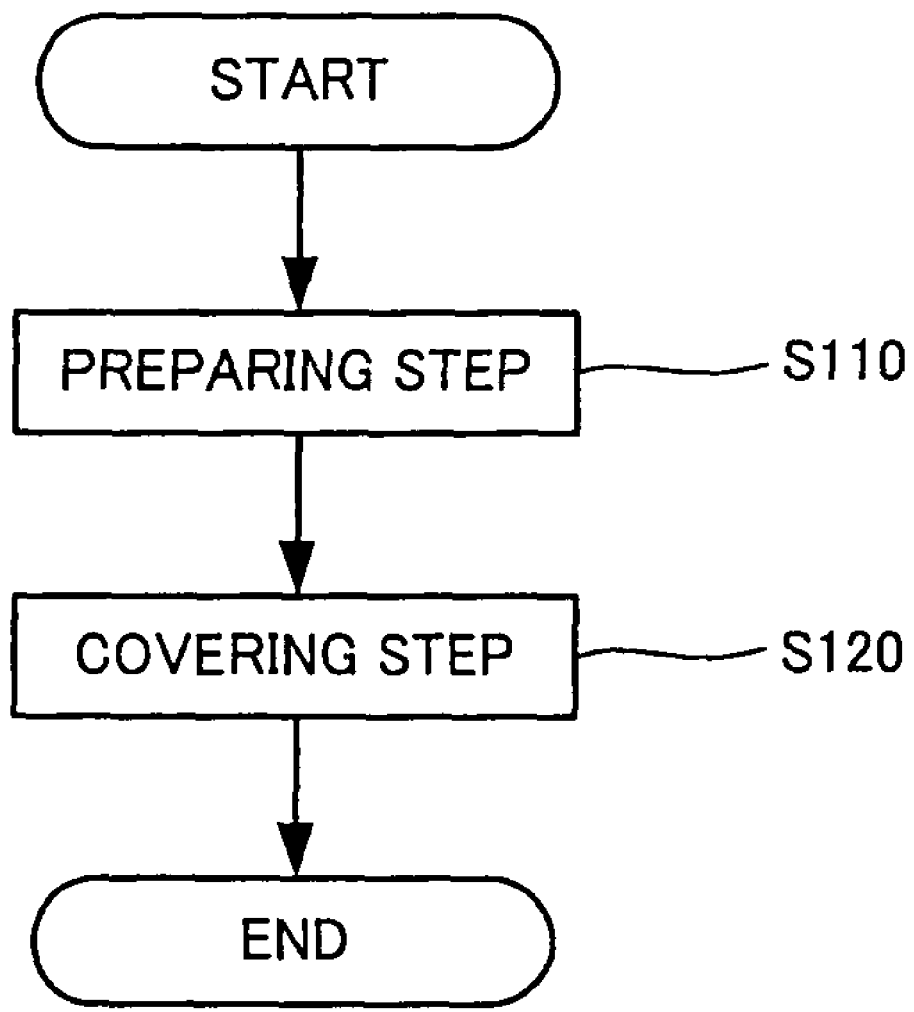
FIG. 5 is a flowchart showing an RFID tag manufacturing method for manufacturing the RFID tag 400 of the fourth embodiment shown in FIG. 4 as an exemplary embodiment of the RFID tag manufacturing method according to the present invention.

FIG. 5 is a flowchart showing the RFID tag manufacturing method for manufacturing the RFID tag 400 of the fourth embodiment shown in FIG. 4 as an exemplary embodiment of the RFID tag manufacturing method according to the present invention.

This RFID tag manufacturing method shown by the flowchart in FIG. 5 includes a preparing step (Step S110) for preparing the inlay 410 and a covering step (Step S120) for covering the inlay 410. The preparing step (Step S110) and the covering step (Step S120) correspond to examples of the preparing step and the covering step according to the present invention respectively.

First, the preparing step (Step S110) will be described.

Figure 6:
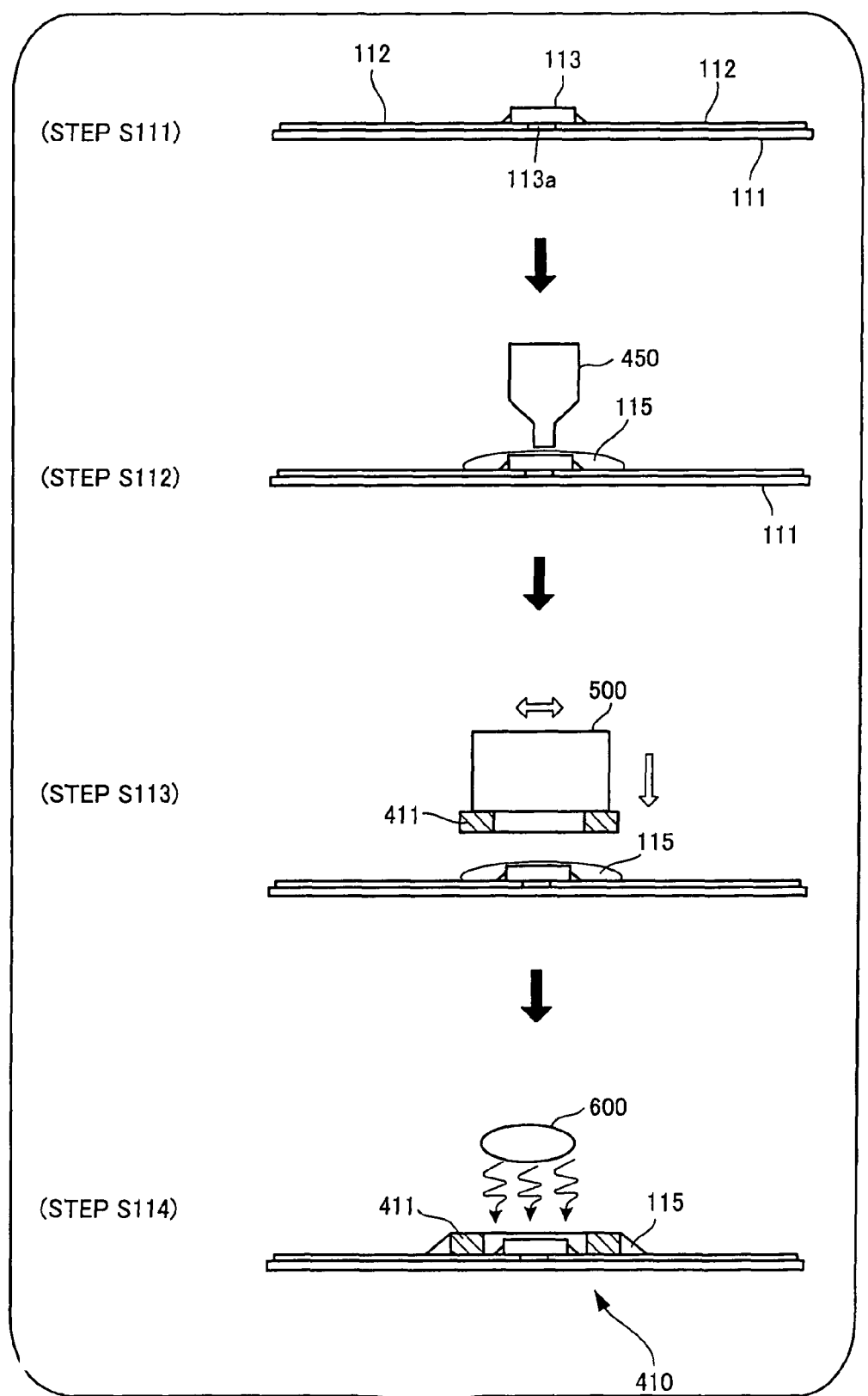
FIG. 6 is a diagram showing details of the preparing step (Step 110) in the flowchart shown in FIG. 5.

FIG. 6 is a diagram showing details of the preparing step (Step 110) in the flowchart shown in FIG. 5.

In this preparing step (Step S110), first, the circuit chip 113 is mounted on the base 111 on the surface on which the antenna 112 is formed (Step S111). Because mounting this circuit chip 113 is widely known, the detailed description will be omitted here.

The circuit chip 113 is mounted in Step S111, and then a dispenser 450 applies the thermosetting adhesive 115 to the base 111 such that the circuit chip is embedded in the thermosetting adhesive 115 (Step S112). Next, a mount tool 500 carries the chip reinforcement member 411 to a position just above the circuit chip 113 and puts the chip reinforcement member 411 on the base 111 such that the circuit chip 113 is housed in the chip reinforcement member 411 (Step S113). Then, a heat source 600 heats the thermosetting adhesive 115 so that the thermosetting adhesive is cured and the inlay 400 is finished (Step S114).

Next, the covering step shown in FIG. 5 (Step S120) will be described.

Figure 7:
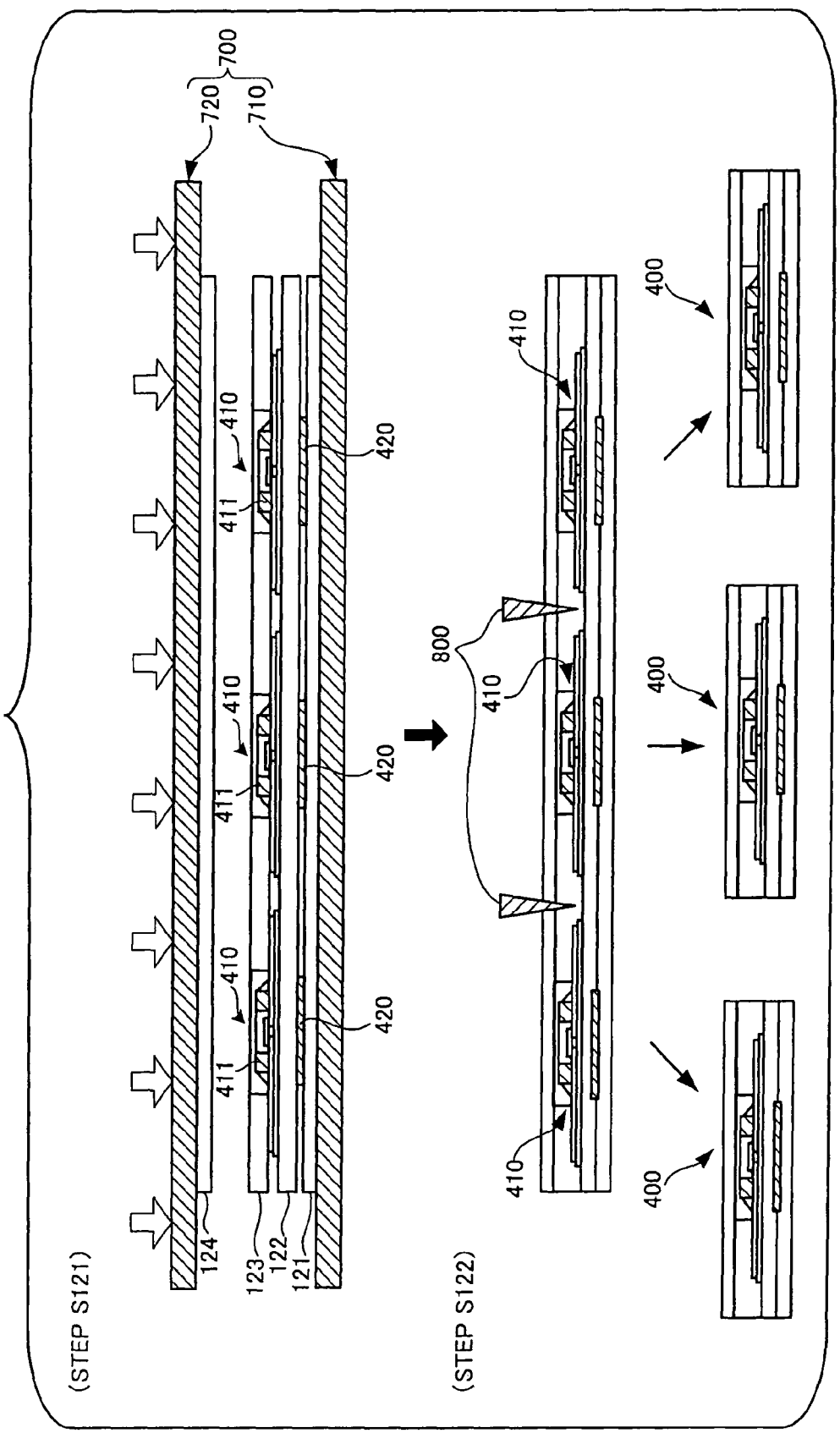
FIG. 7 is a diagram showing details of the covering step (Step 120) in the flowchart shown in FIG. 5.

FIG. 7 is a diagram showing details of the covering step (Step S120) in the flowchart shown in FIG. 5.

In this covering step (Step S120), covering three pieces of the RFID tags 400 is performed in one process.

In this covering step (Step S120), a press apparatus 700 is used. A press stage 710 and a press head 720 of the press apparatus 700 sandwich an object to be pressed and heat the object.

After the inlay 410 is obtained in the preparing step (Step S110) described above, a press and heat process in the following is performed (Step S121) as follows.

First, a bottom rubber sheet 121 of four rubber sheets 121 to 124 is put on the press stage 710. The rubber sheets 121 to 124 form a covering member 120 which covers the inlay 410. Three pieces of the bottom reinforcement members 420 described above are aligned on the bottom rubber sheet 121. Subsequently, the second rubber sheet 122 is overlaid on the three pieces of the bottom reinforcement members 420. Then the three pieces of the inlays 410 are placed such that each of the inlays and each of the bottom reinforcement members sandwich the rubber sheet 420 and are opposite to each other respectively. Next, the third rubber sheet 123 is overlaid on the three pieces of the inlays 410. Here, as shown in FIG. 7, the third rubber sheet 123 is provided with openings for respectively housing the chip reinforcement member 411 in each inlay 410. This rubber sheet 123 is placed such that each of the chip reinforcement members 411 is housed in each of the openings. This third rubber sheet corresponds to an example of the spacer according to the present invention. And lastly, the top rubber sheer 124 is overlaid on the third rubber sheet 123.

Thus, after the four rubber sheets 121 to 124, the bottom reinforcement member 420 and the inlay 410 are placed on the press stage 710, the press head 720 goes down onto the top rubber sheet 124. Then, in the press apparatus 700, the four rubber sheets 121 to 124, the bottom reinforcement member 420 and the inlays 410 are sandwiched by the press stage 710 and press head 720 to be pressed and heated. Through this pressing and heating, the four rubber sheets 121 to 124 are united such that the bottom reinforcement members 420 and the inlays 410 for three pieces of the RFID tags 400 are embedded inside. Then a series of three pieces of the RFID tags 400, in which the bottom reinforcement members 420 and inlays 410 are covered with the rubber covering member 120, is formed.

Following the process of Step S121, a cutter 800 goes down between the respective inlays 410 for cutting the series of the RFID tags 400 to obtain three separate pieces of the RFID tags 400 (Step S122).

According to the RFID manufacturing method described above and also shown in FIG. 3, it is possible to readily manufacture the RFID 400 which has a configuration that withstands for harsh environments with consideration to a user. In addition, in this RFID tag manufacturing method, in Step S121 shown in FIG. 7, the third rubber sheet 123 described above, which is provided with the opening for housing the chip reinforcement member, is used and a periphery of the chip reinforcement member 411 which forms a projection of the inlay 410 is filled with this rubber sheet 123. Accordingly, a shape of the RFID tag 400 finally obtained is flattened.

Next, a fifth embodiment of the RFID tag according to the present invention will be described.

Figure 8:
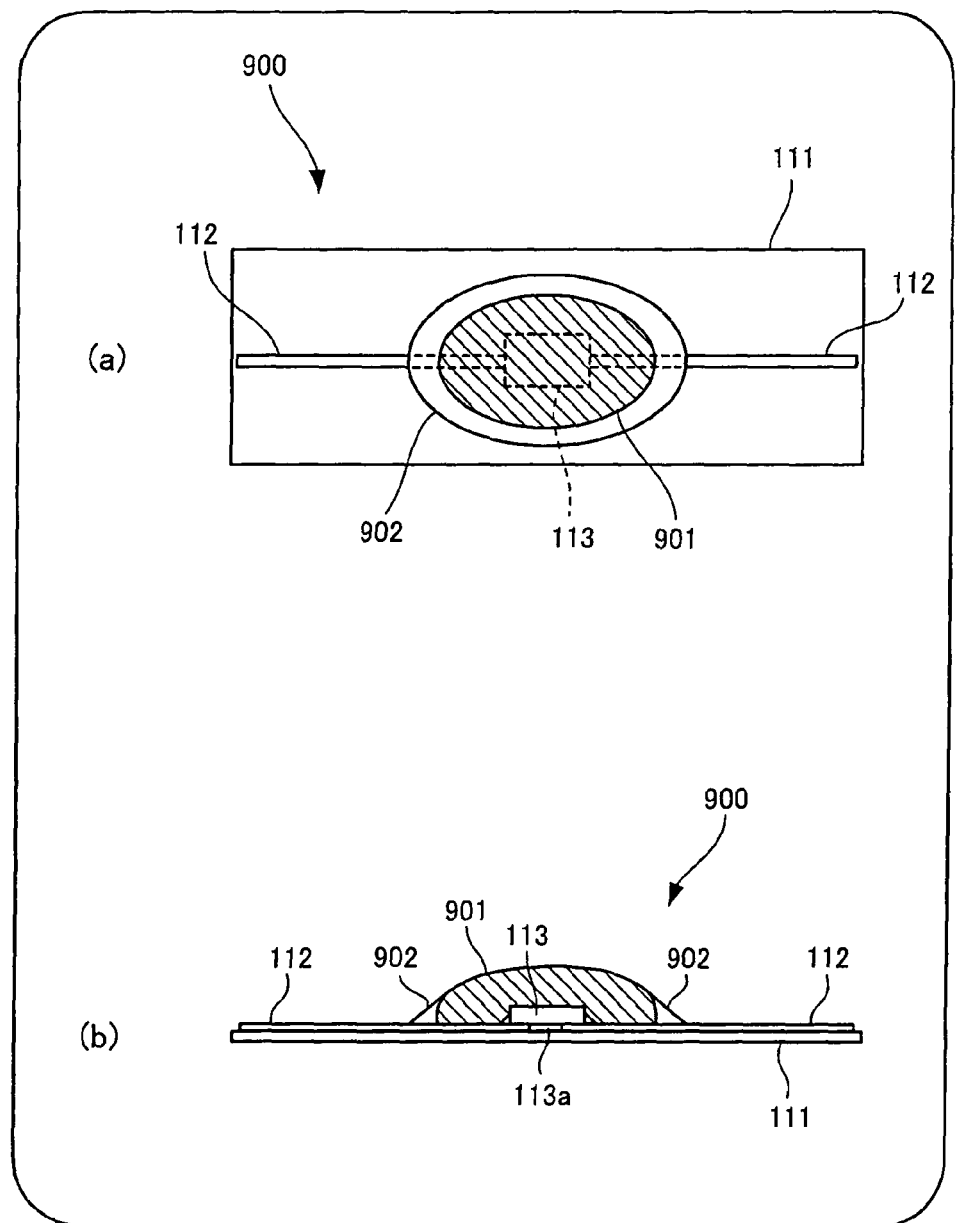
FIG. 8 is a schematic diagram showing a fifth embodiment of the RFID tag according to the present invention.

FIG. 8 is a schematic diagram showing the fifth embodiment of the RFID tag according to the present invention.

In part (a) of this FIG. 8, a top view of an RFID tag 900, the fifth embodiment of the RFID tag according to the present invention is shown in a state in which an internal structure of the RFID tag 900 is seen through. In part (b) of FIG. 8, a lengthwise cross section of the RFID tag 900 is shown.

Also in FIG. 8, elements equal to the ones of the first embodiment shown in FIG. 1 described above are given the same reference characters as in FIG. 1. In the following, redundant descriptions for these elements will be omitted.

The RFID tag 900 of this embodiment is not provided with the chip reinforcement member made of a fiber reinforced resin and the covering member both of which are provided in all of the first through fourth embodiments. The circuit chip 113 is covered with a hard epoxy potting material 901, and whole circumference of which is covered with a flexible rubber adhesive 902. Here, this hard epoxy potting material 901 corresponds to an example of the chip reinforcement member according to the present invention and the flexible rubber adhesive 902 corresponds to an example of the edge covering member according to the present invention.

In the RFID tag 900 of this embodiment, the circuit chip 113 is protected by the hard potting material 901. Further, since the edge of the hard potting material 901 corresponding to an example of "the edge of the chip reinforcement member" according to the present invention is entirely covered with the flexible rubber adhesive 902 including a portion in which this edge and the antenna 112 cross each other, a concentration of a bending stress in this portion is suppressed and therefore a break of the antenna 113 is prevented. In other words, also in this RFID tag 900 shown in FIG. 8, a bending stress to the circuit chip is reduced and simultaneously a break of the antenna is prevented.

Next, a manufacturing method for manufacturing the RFID tag 900 shown in this FIG. 8 will be described. Besides, in here, elements shown in FIG. 8 will be referred without the description of "FIG. 8".

Figure 9:
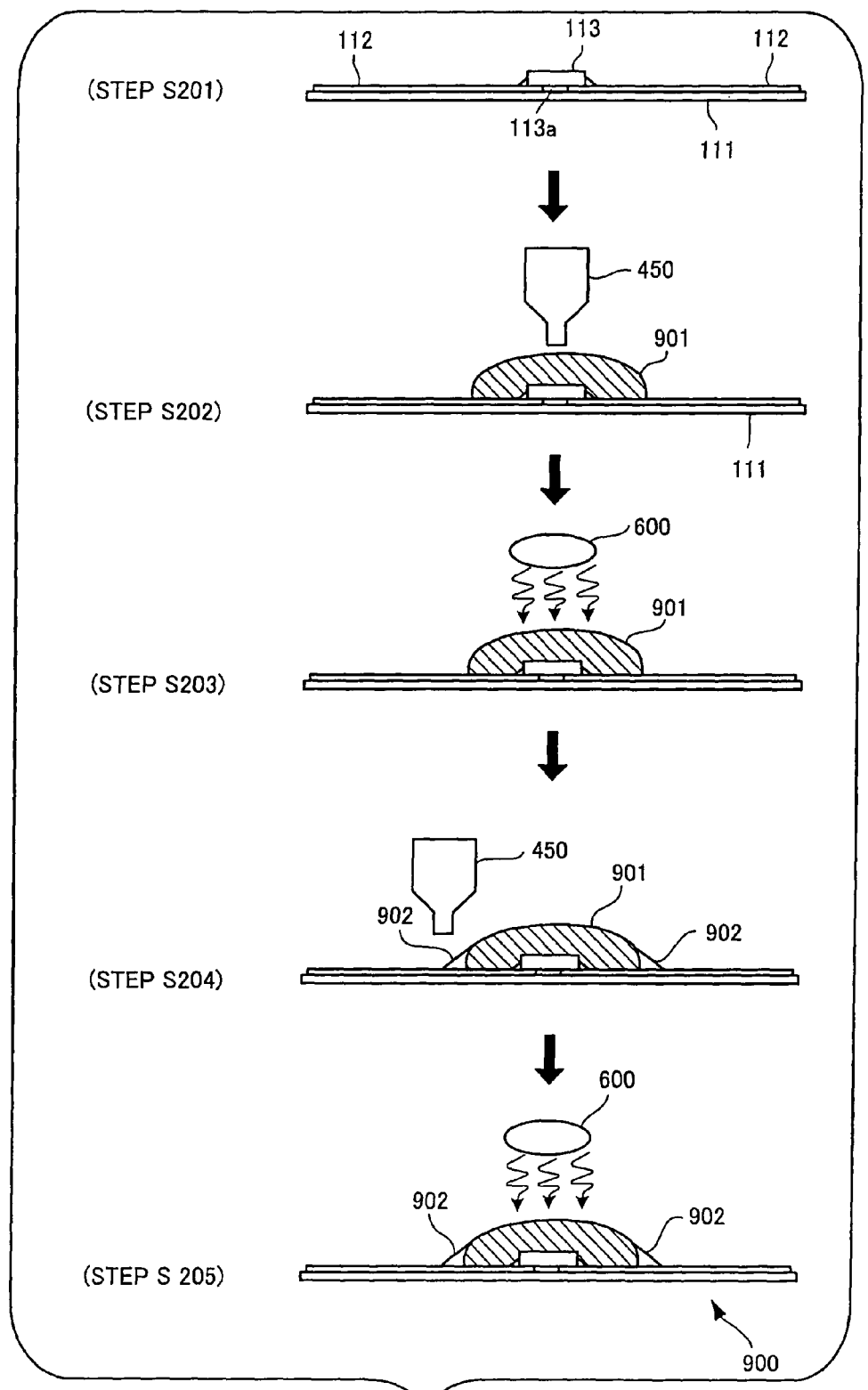
FIG. 9 is a diagram showing an RFID tag manufacturing method for manufacturing the RFID tag 900 shown in FIG. 8.

FIG. 9 is a diagram showing the RFID tag manufacturing method for manufacturing the RFID tag 900 shown in FIG. 8.

In this manufacturing method, first, the circuit chip 113 is mounted on the base 111 on which surface the antenna 112 is formed (Step S201). Since mounting this circuit chip 113 is widely known, the detailed descriptions thereof will be omitted here.

In Step S201, the circuit chip 113 is mounted. Then, the dispenser 450 applies the hard thermosetting potting material 901 in the base 111 such that the circuit chip 113 is buried in the hard potting material 901 (Step S202). The heat source 600 heats the hard thermosetting potting material 901 to cure the hard thermosetting potting material 901 (Step S203). Subsequently, the dispenser 450 applies the thermosetting flexible adhesive 902 to the hard potting material 901 such that the flexible thermosetting adhesive 902 covers an edge of the hard potting material 901 (Step S204). Then, the heat source 600 heats the flexible thermosetting adhesive 902 to cure this flexible thermosetting adhesive 902, and the RFID tag 900 is finished (Step S205).

Through a series of these processes, the RFID tag 900 shown in FIG. 8 is readily manufactured.

Next, a sixth embodiment of the RFID tag according to the present invention will be described.

Figure 10:
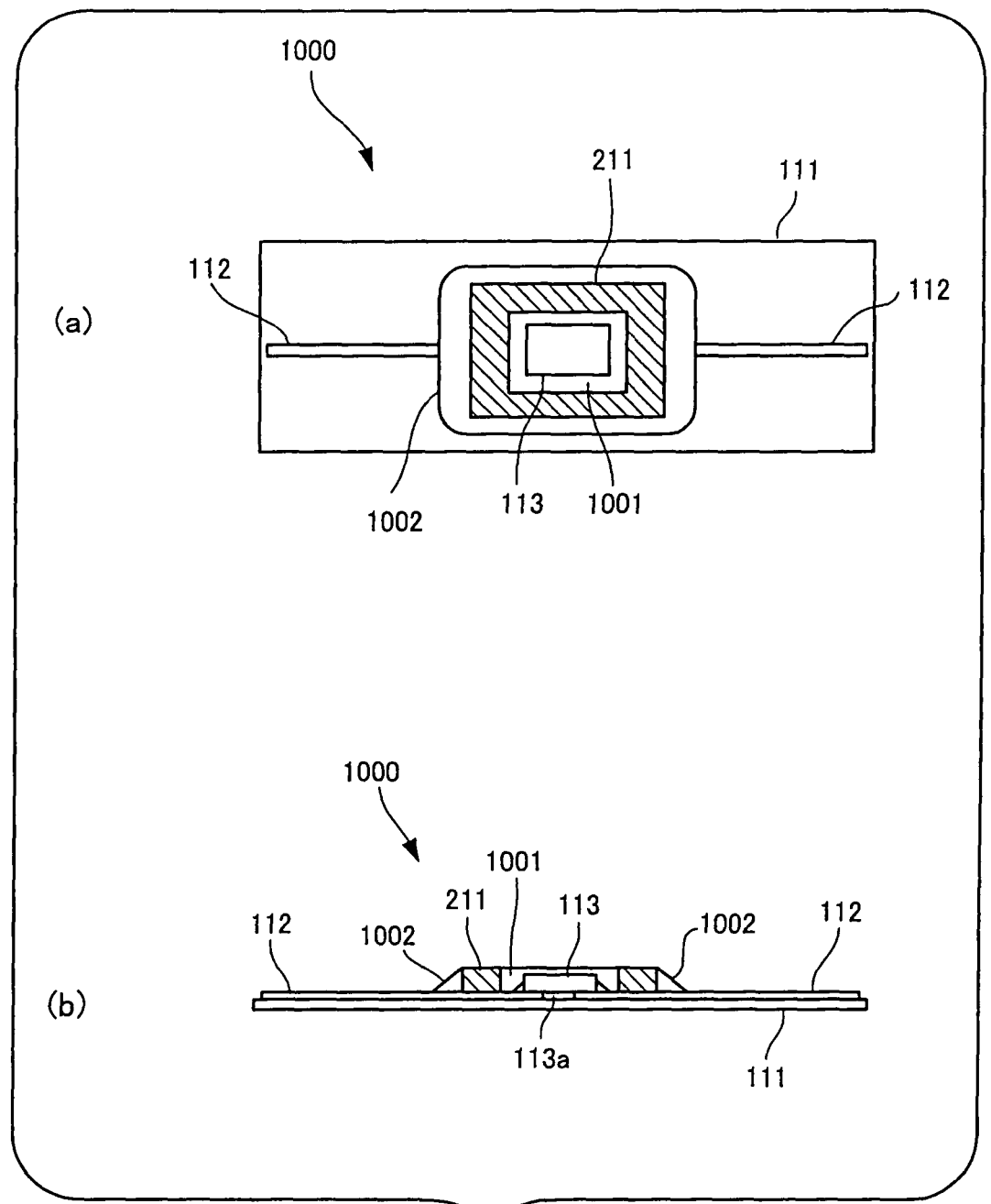
FIG. 10 is a schematic diagram showing a sixth embodiment of the RFID tag according to the present invention.

FIG. 10 is a schematic diagram showing the sixth embodiment of the RFID tag according to the present invention.

In part (a) of this FIG. 10, a top view of an RFID tag 1000, the sixth embodiment of the RFID tag according to the present invention is shown in a state where an internal structure of the RFID tag 1000 is seen through. In part (b) of FIG. 10, a lengthwise cross section of the RFID tag 1000 is shown.

Besides, in FIG. 10, elements equal to the ones of the second embodiment shown in FIG. 2 described above are given the same reference characters as in FIG. 2. In the following, redundant descriptions for these elements will be omitted.

The RFID tag 1000 of this embodiment is not provided with the covering member included in the second embodiment described above. The chip reinforcement member 211 is entirely covered along the edge by a flexible rubber adhesive 1002. In addition, this flexible adhesive 1002 has a role to glue and fix the chip reinforcement member 211 to the base 111. Further, in this RFID tag 1000, the chip reinforcement member 211 is filled up with an epoxy hard potting material 1001 such that the epoxy hard potting material 1001 covers the circuit chip 113. Here, the chip reinforcement member 211 and the flexible adhesive 1002 correspond to examples of the chip reinforcement member and the edge covering member according to the present invention respectively.

In the RFID tag 1000 of this embodiment, the circuit chip 113 is protected by the chip reinforcement member 211. In addition, protection of this circuit chip is strengthened by filling up the hard potting material 1001. Further, since an edge of the chip reinforcement member 211 which corresponds to an example of "the edge of the chip reinforcement member" according to the present invention is entirely covered with the flexible rubber adhesive 1002 including a portion in which the edge and the antenna 112 cross each other, a concentration of a bending stress in this portion is suppressed and therefore a break of the antenna 112 is prevented. In other words, a bending stress to the circuit chip is reduced and simultaneously a break of the antenna is prevented.

Next, a manufacturing method for manufacturing the RFID tag 1000 shown in FIG. 10 will be described. Besides, in here, elements shown in FIG. 10 will be referred without the description of "FIG. 10".

Figure 11:
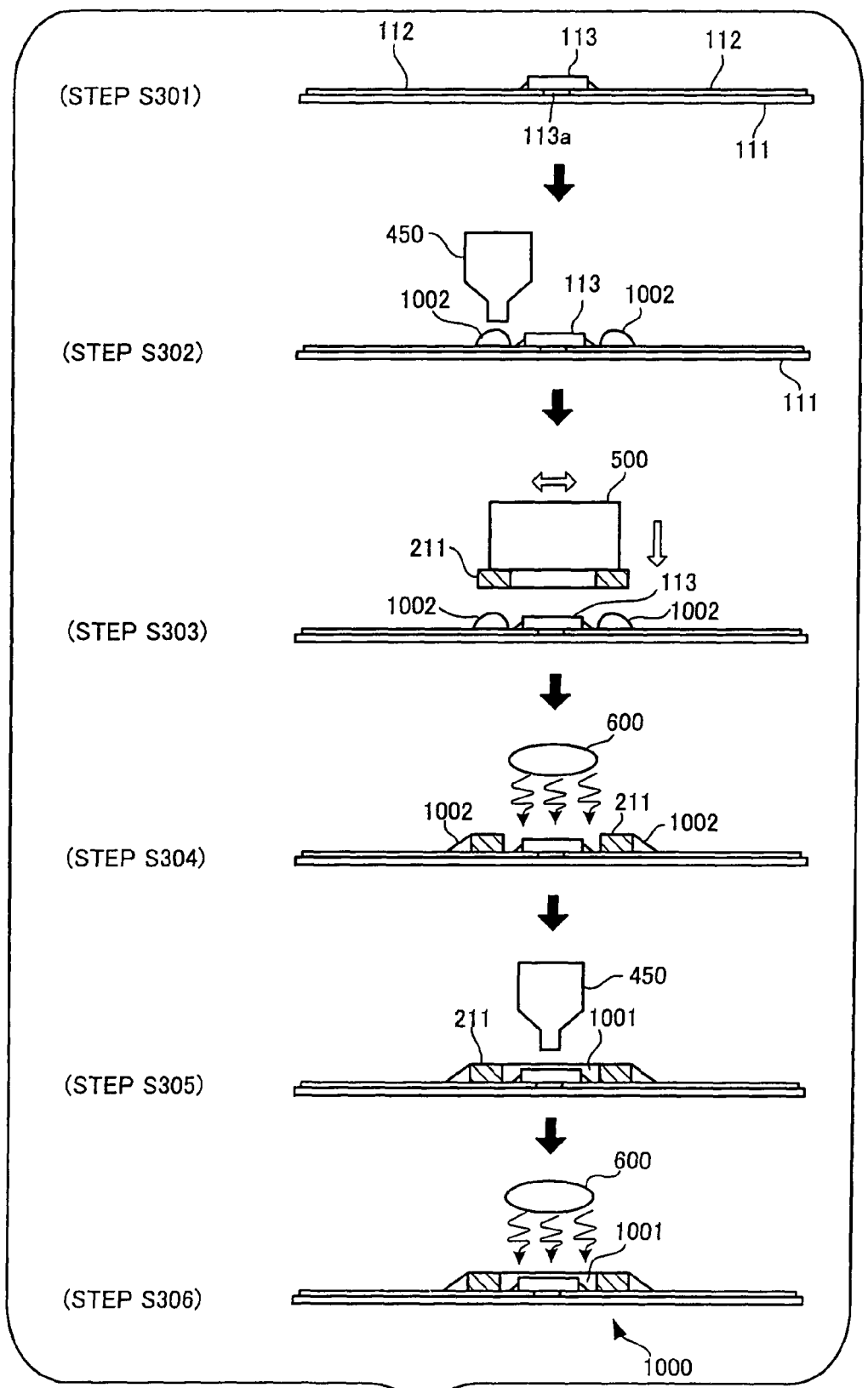
FIG. 11 is a diagram showing an RFID tag manufacturing method for manufacturing the RFID tag 1000 shown in FIG. 10.

FIG. 11 is a diagram showing an RFID tag manufacturing method for manufacturing the RFID tag 1000 shown in FIG. 10.

Also in this manufacturing method, first, the circuit chip 113 is mounted on the base 111 on which surface the antenna 112 is formed (Step S301). Since mounting this circuit chip 113 is widely known, the detailed descriptions thereof will be omitted here.

In Step S301, the circuit chip 113 is mounted. Then, the dispenser 450 applies a flexible thermosetting potting material 1002 to the base 111 such that the flexible thermosetting potting material 1002 surrounds a periphery of the circuit chip 113 (Step S302). Next, the mount tool 500 carries the chip reinforcement member 211 to a position just above the circuit chip 113 and puts the chip reinforcement member 211 on the base 111 such that the circuit chip 113 is housed in the chip reinforcement member 211 (Step S303). Then, the heat source 600 heats the flexible thermosetting adhesive 1002 so that this flexible thermosetting adhesive is cured and the chip reinforcement member 211 is glued and fixed to base 111 (Step S304). Subsequently, the dispenser 450 fills the chip reinforcement member 211 with the hard thermosetting potting material 1001 such that the hard thermosetting potting material 1001 covers the circuit chip inside the chip reinforcement member 211 (Step S305), and the heat source 600 heats and cures the hard thermosetting potting material 1001 to finish the RFID tag 1000 (Step S306).

Through a series of these processes, the RFID tag 1000 shown in FIG. 10 is readily manufactured.

Next, a seventh embodiment of the RFID tag according to the present invention will be described.

Figure 12:
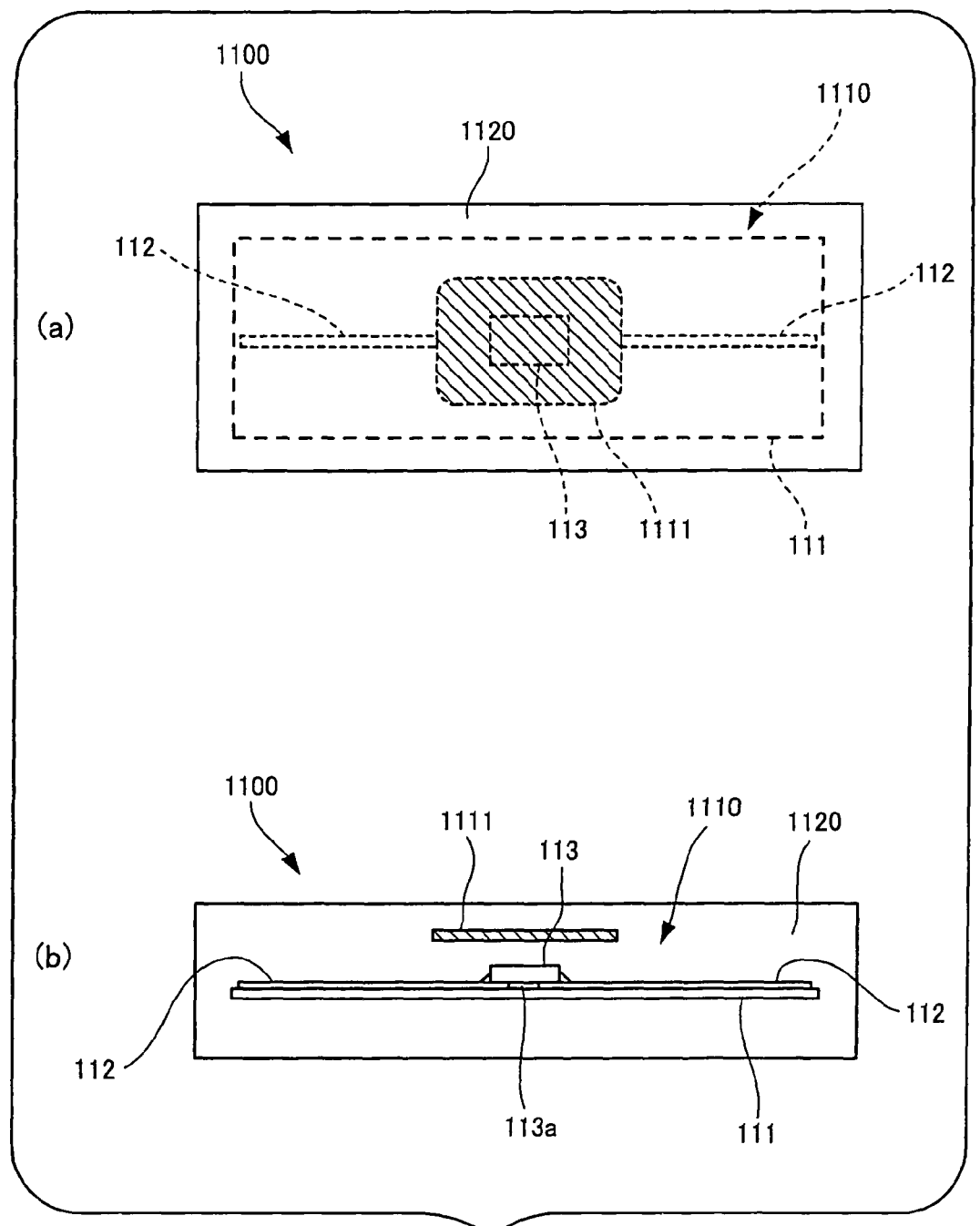
FIG. 12 is a schematic diagram showing a seventh embodiment of the RFID tag according to the present invention.

FIG. 12 is a schematic diagram showing a seventh embodiment of the RFID tag according to the present invention.

In part (*a*) of this FIG. 12, a top view of an RFID tag 1100, the seventh embodiment of the RFID tag according to the present invention is shown in a state where an internal structure of the RFID tag 1100 is seen through. In part (*b*) of FIG. 12, a lengthwise cross section of an RFID tag 1100 is shown.

Besides, in FIG. 12, elements equal to the ones of the first embodiment shown in FIG. 1 described above are given the same reference characters as in FIG. 1. In the following, redundant descriptions for these elements will be omitted.

In the RFID tag 1100 of this embodiment, an inlay 1110 is provided with a chip reinforcement member 1111 whose shape is different from that of the chip reinforcement member 114 according to the first embodiment, and the chip reinforcement member 1111 is embedded in a covering member 1120 without contacting the base 111, the antenna 112 and the circuit chip 113. This inlay 1110, the chip reinforcement member 1111 and the covering member 1120 which are shown in FIG. 12 also correspond to examples of the inlay, the chip reinforcement member and the covering member according to the present invention respectively.

The reinforcement member 1111 shown in FIG. 12 which is neither glued nor fixed to the base 112 is away from, like floating, over the circuit chip 113. This chip reinforcement member 1111 also prevents a shape change of the RFID tag 1100 from affecting a periphery of the circuit chip 113, thereby preventing peeling, break of the circuit chip 112 and the like. In addition, in this embodiment, because the chip reinforcement member 1111 does not contact with the antenna 112, there is no concentration of bending stress in a limited part and a break of the antenna 112 is prevented.

Next, a manufacturing method for manufacturing the RFID tag 1100 shown in FIG. 12 will be described. Besides, in here, elements shown in FIG. 12 will be referred without the description of "FIG. 12".

In this manufacturing method, after the circuit chip 113 is mounted on the base 111 on whose surface the antenna 112 is formed, the covering step for covering the inlay 1110 is performed simultaneously with arranging the chip reinforcement member 1111.

Figure 13:
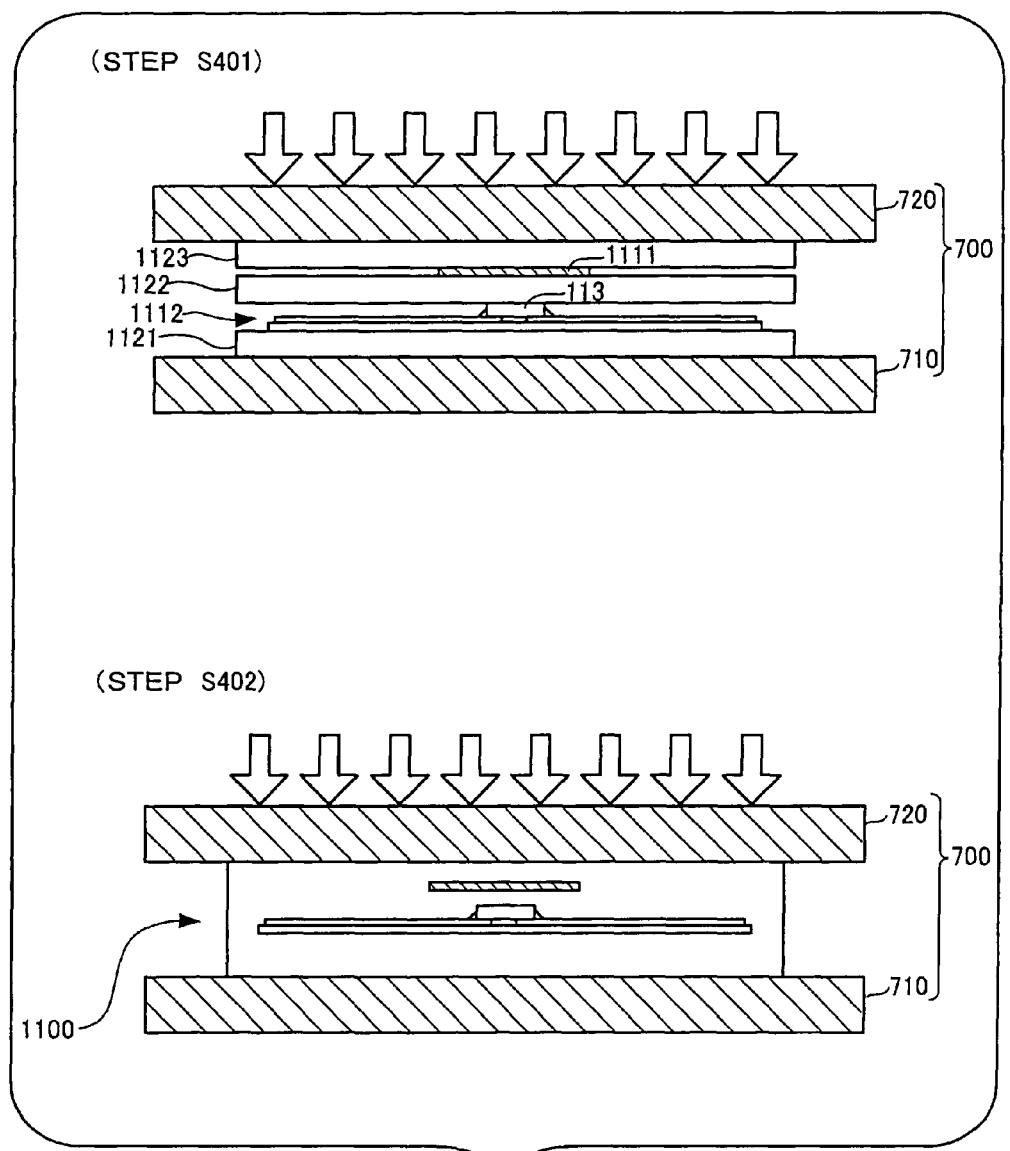
FIG. 13 is a diagram showing details of the covering step of the RFID tag manufacturing method for manufacturing the RFID tag 1100 shown in FIG. 12.

FIG. 13 is a diagram showing details of the covering step of the RFID tag manufacturing method for manufacturing the RFID tag 1100 shown in FIG. 12.

The covering step for one piece of the RFID tag 1100 is shown in this FIG. 13.

In the covering step which will be described below, the same press apparatus as the press apparatus 700 shown in FIG. 7 is used. Therefore, in this FIG. 13, this press apparatus is shown with the same symbol as that in FIG. 7.

First, a portion 1112 of the inlay 1110 excluding the chip reinforcement member 1111, three rubber sheets 1121 to 1123 which form the covering member 1120 and the chip reinforcement member 1111 are arranged as follows (STEP S401). First, the bottom rubber sheet 1121 of the three rubber sheets 1121 to 1123 is placed on the press stage 710, then the portion 1112 of the inlay 1110 is placed on the bottom rubber sheet 1121. Subsequently, the second rubber sheet 1122 is overlaid on the portion 1112 of the inlay 1110, and the chip reinforcement member 1111 is placed in a position where the chip reinforcement member 1111 and the circuit chip 113 sandwich the rubber sheet 1122 and oppose to each other. Then, finally, the top rubber sheet 1123 is overlaid.

Thus, after the portion 1112 of the inlay 1110, the three rubber sheets 1121 to 1123 which form the covering member 1120 and the chip reinforcement member 1111 are placed on the press stage 710, the press head 720 goes down onto the top rubber sheet 1123 and the three rubber sheet 1121, 1122 and 1123, the portion 1112 of the inlay 1110 and the chip reinforcement member 1111 which are sandwiched by the press stage 710 and the press head 720 are pressed and heated to be integrated (Step S402). By this integration, the RFID tag 1100 shown in FIG. 12 is finished.

Through a series of these processes, the RFID 1100 tag shown in FIG. 12 is readily manufactured.

Next, an eighth embodiment according to the present invention will be described.

Figure 14:
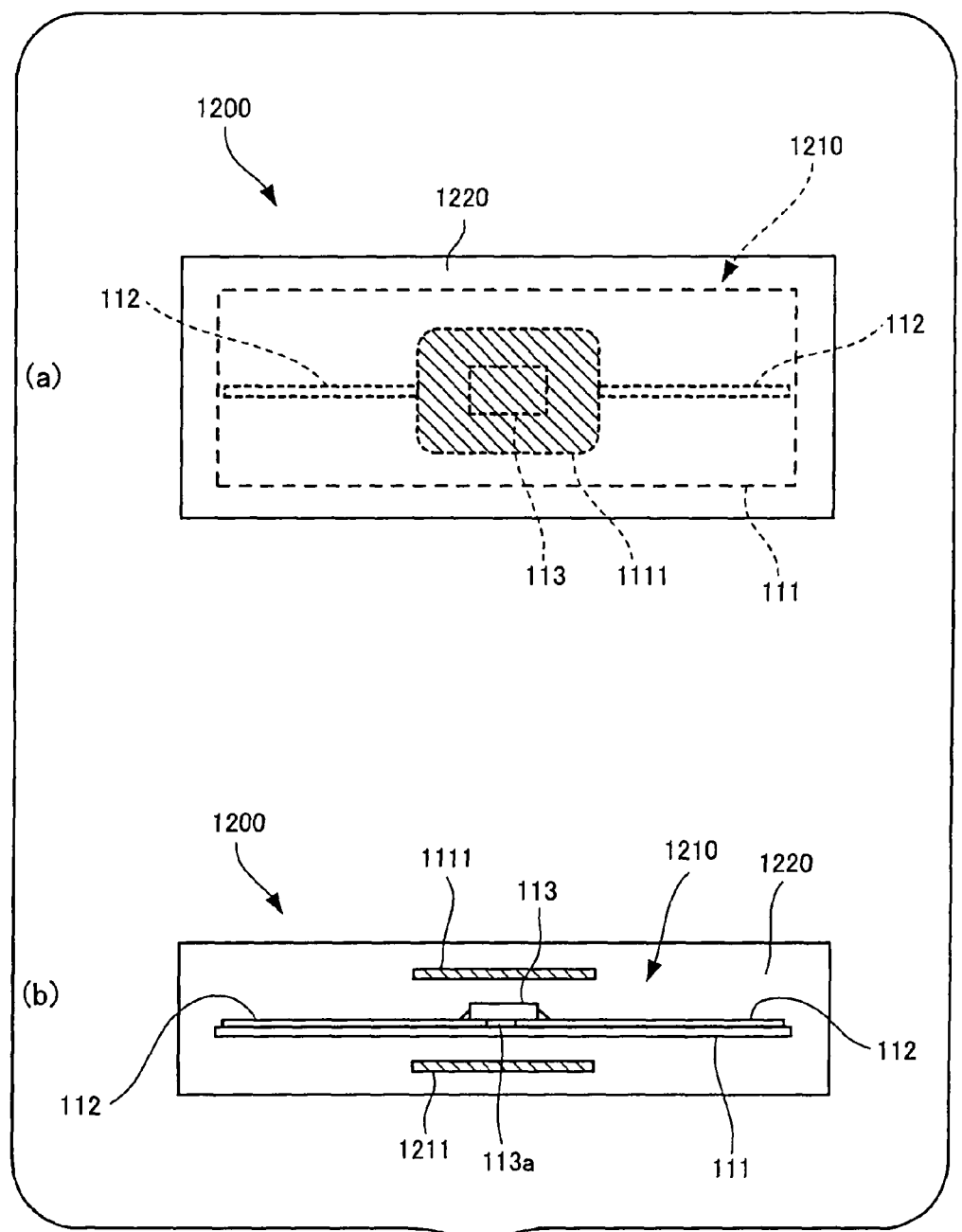
FIG. 14 is a schematic diagram showing an eighth embodiment of the RFID tag according to the present invention.

FIG. 14 is a schematic diagram showing the eighth embodiment of the RFID tag according to the present invention.

In part (*a*) of this FIG. 14, a top view of an RFID tag 1200, the eighth embodiment of the RFID tag according to the present invention is shown in a state where an internal structure of the RFID tag 1200 is seen through. In part (*b*) of FIG. 14, a lengthwise cross section of an RFID tag 1200 is shown.

Besides, in FIG. 14, elements equal to the ones of the seventh embodiment shown in FIG. 12 described above are given the same reference characters as in FIG. 12. In the following, a redundant description for these elements will be omitted.

In the RFID tag 1200 of this embodiment, the inlay 1210 has a structure in which a bottom reinforcement member 1121 is added to the inlay of the seventh embodiment shown in FIG. 12 such that the bottom reinforcement member 1121 and the chip reinforcement member 1111 sandwich the base 111 and the bottom reinforcement member 1121 is placed away from the base 111. The inlay 1210 and the bottom reinforcement member 1211 correspond to examples of the inlay and the bottom reinforcement member according to the present invention respectively. In addition, the covering member 1220 of this embodiment also fills the gap between the inlay 1210 and the bottom reinforcement member 1211. This covering member 1220 corresponds to an example of the covering member according to the present invention.

The RFID tag 1200 shown in FIG. 14 has a configuration in which protection of the circuit chip is strengthened by the bottom reinforcement member 1211 while preserving the prevention of the antenna break and the like obtained in the seventh embodiment described above.

Next, a manufacturing method for manufacturing this RFID tag 1200 shown in FIG. 14 will be described. Besides, in here, elements shown in FIG. 14 will be referred without the description of "FIG. 14".

In this manufacturing method, after the circuit chip 113 is mounted on the base 111 on whose surface the antenna 112 is formed, the covering step for covering the inlay 1220 is performed simultaneously with arranging the chip reinforcement member 1111 and the bottom reinforcement member 1211.

Figure 15:
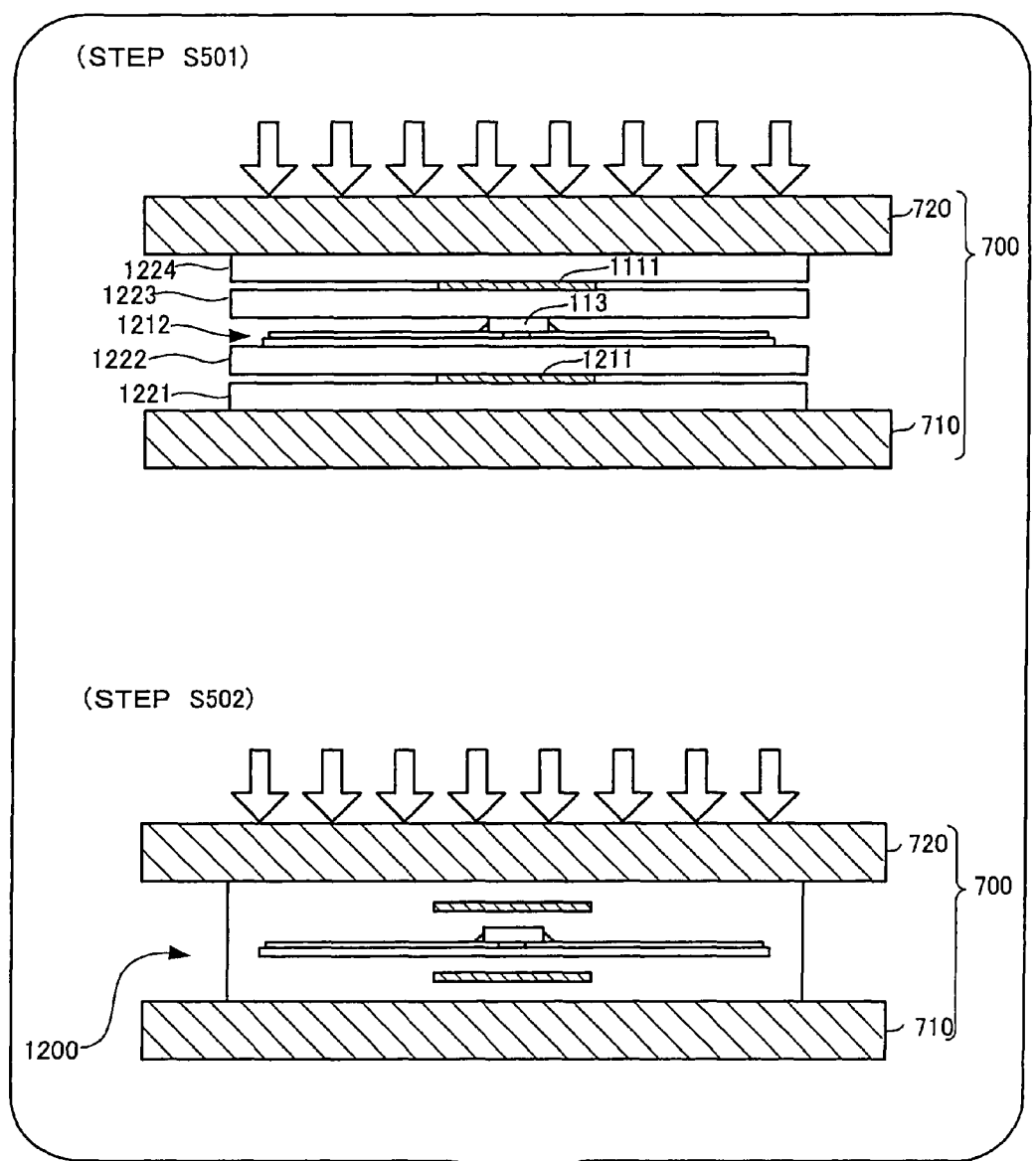
FIG. 15 is a diagram showing details of the covering step of the RFID tag manufacturing method for manufacturing the RFID tag 1200 shown in FIG. 14.

FIG. 15 is a diagram showing details of the covering step of the RFID tag manufacturing method for manufacturing the RFID tag 1200 shown in FIG. 14.

Also in this FIG. 15, the covering step for one piece of the RFID tag 1200 is shown.

In the covering step which will be described below, the same press apparatus as the press apparatus 700 shown in FIG. 7 and FIG. 13 is used. Therefore, in this FIG. 15, this press apparatus is shown with the same reference characters as in FIG. 7 and FIG. 13.

First, a portion 1212 of the inlay 1210 excluding the chip reinforcement member 1111 and the bottom reinforcement member 1211, four rubber sheets 1221 to 1224, the chip reinforcement member 1111, and the bottom reinforcement member 1211 are arranged as follows (STEP S501). First, the most bottom rubber sheet 1221 of the four rubber sheets 1221 to 1224 is placed on the press stage 710, then the bottom reinforcement member 1211 is placed on the bottom rubber sheet 1221. Subsequently, the second rubber sheet 1222 is overlaid on the bottom reinforcement member 1211, and the portion 1212 of the inlay 1210 is placed at a position where the bottom reinforcement member 1211 and the circuit chip 113 sandwich the second rubber sheet 1222 and are opposite to each other with respect to the second rubber sheet 1222. Next, the third rubber sheet 1223 is overlaid on the portion 1212 of the inlay 1210, the chip reinforcement member 1111 is placed at a position where the chip reinforcement member 1111 and the circuit chip 113 sandwich the third rubber sheet 1223 and are opposite to each other. Then, finally, the top rubber sheet 1224 is overlaid.

Thus, the portion 1212 of the inlay 1210 excluding the chip reinforcement member 1111 and the bottom reinforcement member 1211, four rubber sheets 1221 to 1224, the chip reinforcement member 1111, and the bottom reinforcement member 1211 are placed on the press stage 710. Then, the press head 720 goes down onto the top rubber sheet 1224 and the four rubber sheets 1221 to 1224, the portion 1112 of the inlay 1110, the chip reinforcement member 1111 and the bottom reinforcement member 1211 are sandwiched by the press stage 710 and the press head 720 and are pressed and heated to be integrated (Step S502). By this integration, the RFID tag 1200 shown in FIG. 14 is finished.

Through a series of these processes, the RFID tag 1200 shown in FIG. 14 is readily manufactured.

Further, in the description above, as an example of the chip reinforcement member according to the present invention, the chip reinforcement member 114 made of the fiber reinforced resin is shown but a type of the fiber reinforced resin is not specified. The fiber reinforced resin according to the present invention may be, for example, a FRP (Fiber Reinforced Plastics) or a glass epoxy resin. In addition, the chip reinforcement member according to the present invention in not limited to such fiber reinforced resin and may be a thermal plasticity plastic or a thermosetting resin.

In addition, in the description above, as the adhesive for gluing and fixing the chip reinforcement member 114 to the base 111, the thermosetting adhesive is exemplified, but this present invention is not limited to such an example. This adhesive may be a UV-curing adhesive, an anaerobic adhesive, a moisture-curing adhesive or a 2-part adhesive.

In addition, in the description above, of examples of the bottom reinforcement member according to the present invention, the bottom reinforcement member 312 made of a fiber reinforced resin is exemplified as an example of the type of the bottom reinforcement member which is glued to be fixed on the bottom face of the inlay but a kind of the fiber reinforced resin is not specified. A fiber reinforced resin which forms this type of the bottom reinforcement member may be a FRP or a glass epoxy resin. Further, the above-mentioned type of the bottom reinforcement member is not limited to ones made of such fiber reinforced resins, and may be, for example, a thermoplastic plastic or a thermosetting plastic.

In addition, in the description above, of examples of the bottom reinforcement member according to the present invention, as an example of a type of the bottom reinforcement member which is arranged away from the inlay, the bottom reinforcement member 420 made of the plastic sheet is exemplified. But this invention is not limited so. This type of the bottom reinforcement member which is arranged away from the inlay may be the one formed with a net made of a nylon®.

In addition, in the description above, as an example of the covering member according to the present invention, the rubber covering member 120 is exemplified but a kind of the rubber is not specified. However, a rubber which forms the covering member according to the present invention may be, for example, a urethane rubber, a silicon rubber or a fluorine rubber.

In addition, in the description above, as an example of the chip reinforcement member, the chip reinforcement member 113 in which an opening is formed for housing the chip is exemplified. However, this invention is not limited so. The chip reinforcement member according to the present invention may be, for example, a chip reinforcement member without such opening but that simply has an appearance of a plate shape and is arranged so as to cover the circuit chip.

Further, in the description above, as an example of the edge covering member according to the present invention, the flexible rubber adhesive is exemplified but a kind of the rubber is not specified. However, a rubber which forms the edge covering member according to the present invention may be, for example, a urethane rubber, or a silicon rubber.

Furthermore, in the description above, as an example of the edge covering member according to the present invention, the flexible adhesives which entirely covers a periphery of the hard potting material 901 and the chip covering member 211 are exemplified. However, this invention is not limited so. The edge covering member according to the present invention may cover, for example, only a portion where the edge and the antenna cross each other.

What is claimed is:

1. An RFID tag, comprising:
    a base;
    an antenna for communication that extends on the base;
    a circuit chip that is electrically connected to the antenna and that performs radio communication through the antenna;
    a chip reinforcement member that covers at least upper portions both of at least a periphery of the circuit chip and at least a portion of the antenna when the base is arranged as a bottom of the RFID tag; and
    a covering member made of rubber that covers the base, the antenna, the circuit chip and the chip reinforcement member, and that is more flexible than the chip reinforcement member, the covering member mediating between the circuit chip and the chip reinforcement member, wherein
    an uppermost layer is formed by the covering member.

2. The RFID tag according to claim 1, wherein
    the chip reinforcement member is embedded in the covering member without contacting the base, the antenna and the circuit chip.

3. The RFID tag according to claim 1 further comprising
    a bottom reinforcement member that is located such that the bottom reinforcement member and the chip reinforcement member sandwich the base, and that is embedded in the covering member without contacting the base.

4. An RFID tag, comprising:
a base;
an antenna for communication that extends on the base;
a circuit chip that is electrically connected to the antenna to perform radio communications through the antenna;
a chip reinforcement member that covers at least upper portions both of at least a periphery of the circuit chip and at least a portion of the antenna when the base is arranged as a bottom of the RFID tag; and
an edge covering member made of rubber that covers at least a portion of an edge of the chip reinforcement member, the portion where the edge of the chip reinforcement member and the antenna cross each other, the edge covering member being more flexible than the chip reinforcement member, the edge covering member mediating between the circuit chip and the chip reinforcement member, wherein
an uppermost layer is formed by the covering member.

5. The RFID tag according to claim 1, wherein the base is more flexible than the chip reinforcement member.

6. The RFID tag according to claim 4, wherein the base is more flexible than the chip reinforcement member.

7. The RFID tag according to claim 1, wherein the chip reinforcement member covers only a periphery of the circuit chip and a portion of the antenna.

8. The RFID tag according to claim 4, wherein the chip reinforcement member covers only a periphery of the circuit chip and a portion of the antenna.

9. The RFID tag according to claim 1 further comprising
a bottom reinforcement member that is located such that the bottom reinforcement member and the chip reinforcement member sandwich the base.

10. The RFID tag according to claim 4 further comprising
a bottom reinforcement member that is located such that the bottom reinforcement member and the chip reinforcement member sandwich the base.

11. A device, comprising:
an RFID tag having a base, the base in contact with circuit components and an antenna, the circuit components electrically connected to the antenna;
a first protective covering above the circuit components and the antenna; and
a second flexible covering made of rubber and forming an uppermost layer by enveloping the first covering and between the first covering and the circuit components to fully cover the RFID tag, the second covering more flexible than the first covering.

* * * * *